United States Patent [19] [11] 4,095,274
Gordon [45] June 13, 1978

[54] APPARATUS FOR DETERMINING FOOD CONTENT

[76] Inventor: Carl Gordon, 1203 S. Spaulding Ave., Los Angeles, Calif. 90019

[21] Appl. No.: 791,321

[22] Filed: Apr. 27, 1977

[51] Int. Cl.[2] .......... G06F 15/42
[52] U.S. Cl. .......... 364/715; 235/1 D; 312/186; 364/413; 364/708
[58] Field of Search .......... 235/152, 156, 168, 92 CP, 235/92 SA, 1 D, 61 A; 312/186; 211/53; 73/190 R; 64/2, 3; 174/52 R

[56] References Cited

U.S. PATENT DOCUMENTS

| | | | |
|---|---|---|---|
| 3,550,980 | 12/1970 | Neilsen | 312/186 |
| 3,813,533 | 5/1974 | Cone et al. | 235/156 |
| 3,920,979 | 11/1975 | Kilby et al. | 235/168 |
| 4,038,535 | 7/1977 | Aldridge et al. | 235/152 |

*Primary Examiner*—David H. Malzahn
*Attorney, Agent, or Firm*—George J. Netter

[57] ABSTRACT

A hollow lightweight housing is provided, adapted for ready location on a horizontal surface such as a counter top adjacent a stove or oven. A set of food information bearing cards are carried by a rotatable assembly mounted within the housing, enabling selective presentation of any one of the cards to the ready view of the user. Mounted on a generally horizontal wall of the housing is the pushbutton portion of a digital calculator, the display of which is closely located to the cards when located for viewing so that information taken from the cards may be quickly and easily inserted in the calculator with readout being also readily available for comparison to the information on the cards. Also mounted on the same horizontal housing wall, immediately adjacent the calculator pushbuttons, are timing control switches permitting control of the calculator display as both an output display and a digital time readout. Still further, when in the time mode, the switches may be set for a stop-start or elapsed time indication, and an alarm in the form of a buzzer is provided for indicating the end of a predetermined elapsed time.

4 Claims, 4 Drawing Figures

FIG. 1.
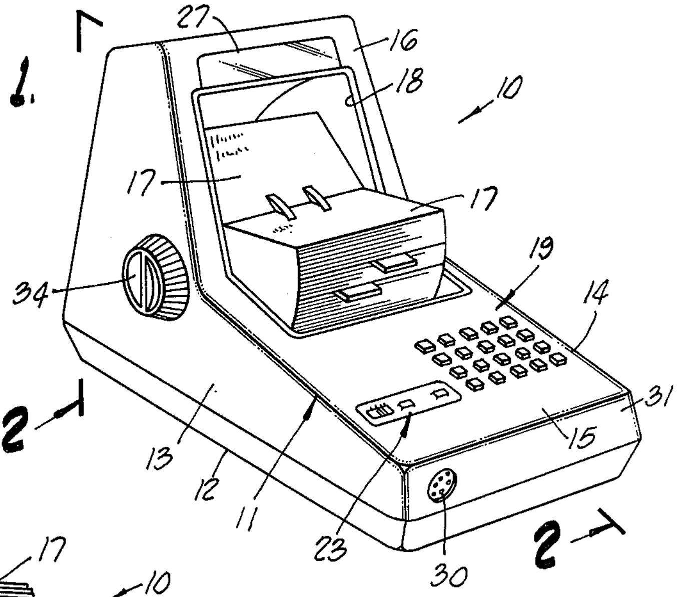
FIG. 2.
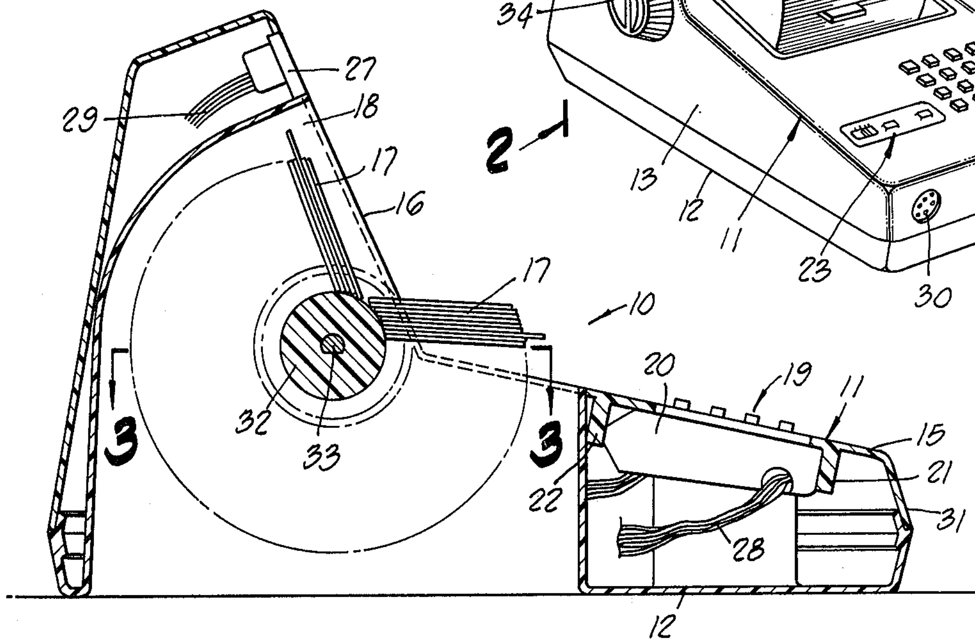
FIG. 3.
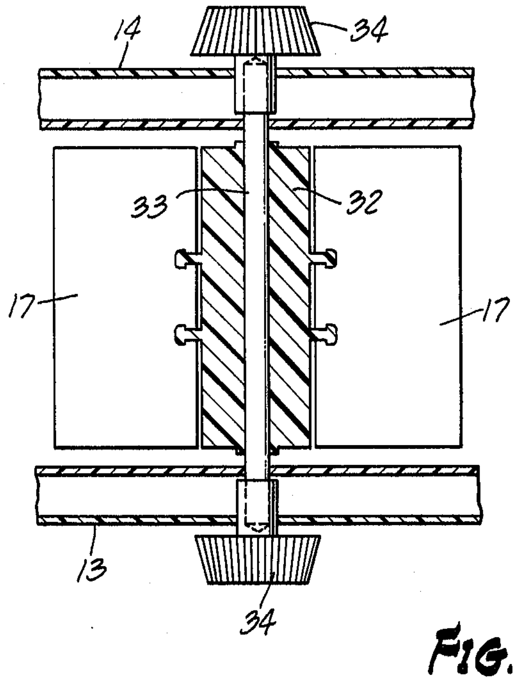
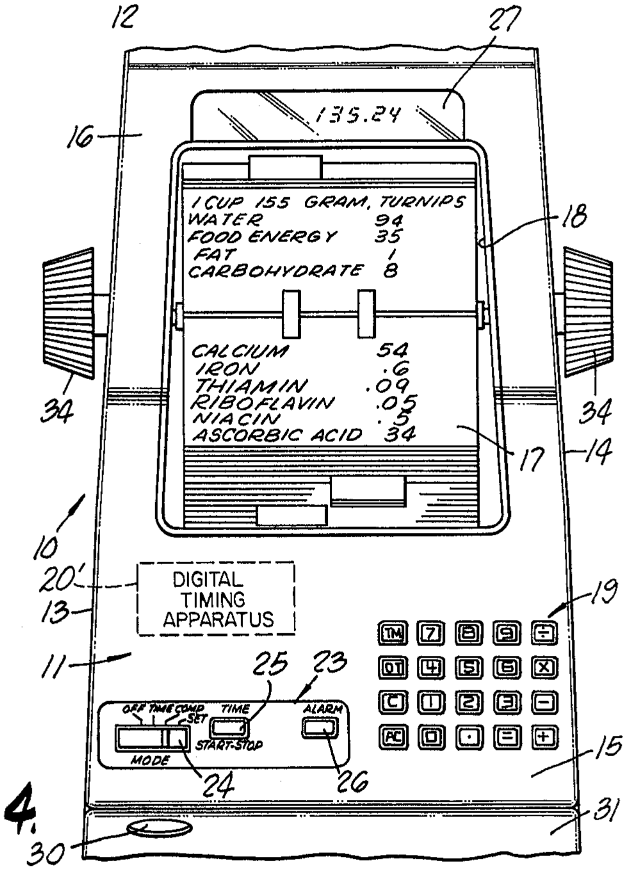
FIG. 4.

APPARATUS FOR DETERMINING FOOD CONTENT

The present invention relates generally to apparatus for determining food content, and, more particularly, to such apparatus including combination means for determining and calculating the substantive content of various foodstuffs (e.g., calories, minerals, etc.) and control means selectively settable to display quantitatively the foodstuff content and timing information.

BACKGROUND OF THE INVENTION

It is a usual matter at the present time, especially for those having a health or weight problem, to be concerned about the caloric value of or amount of one or more particular substances in the food they eat. For example, many persons have restricted diets which only permit eating certain kinds of food to a limited extent (e.g., salt-free diets). In the past, caloric and mineral content of foods have had to be determined by reference to booklets or charts giving the contents of the different foods and then either mentally or manually calculating the total caloric or other substantive content for a given meal. All of this was more often than not accomplished in the kitchen and closely adjacent the area where meals were prepared.

Still further, in meal preparation, it is desirable to have timing apparatus closely located to the stove or oven in order to heat different food materials for required prescribed time periods. Also, at times where a given cooking operation necessitates extended heating, it is useful to have some means of bringing to the attention of the cook when the predetermined period of time has elapsed. All of such devices in the past have either been incorporated into a combined relatively complex system cooperatively operating with the oven or stove, or, alternatively, individual single purpose timing equipment has been available (e.g., settable timers) which must be separately referred to and the information obtained therefrom, then correlated with other apparatus and devices located remotely therefrom.

SUMMARY OF THE INVENTION

There is provided in accordance with the practice of this invention, a hollow lightweight housing adapted for ready location on a horizontal surface such as a counter top adjacent a stove or oven. A set of food information bearing cards (e.g., nutritional, caloric and other substance content) are carried by a rotatable assembly mounted within the housing, enabling selective presentation of any one of the cards to the ready view of the user. Mounted on a generally horizontal wall of the housing is the pushbutton portion of a digital calculator, the display of which is closely located to the cards when located for viewing so that information taken from the cards may be quickly and easily inserted in the calculator with readout being also readily available for comparison to the information on the cards. Also mounted on the same horizontal housing wall, immediately adjacent the calculator pushbuttons, are timing control switches permitting control of the calculator display as both an output display and a digital time readout. Still further, when in the time mode, the switches may be set for a stop-start or elapsed time indication, and an alarm in the form of a buzzer is provided for indicating the end of a predetermined elapsed time.

DESCRIPTION OF THE DRAWING

FIG. 1 is a perspective view of the device of this invention.

FIG. 2 is a sectional, side elevational view, taken along line 2—2 of FIG. 1.

FIG. 3 is a plan sectional, partially fragmentary view, taken along line 3—3 of FIG. 2.

FIG. 4 is a plan, partially fragmentary view of the apparatus of FIG. 1.

DESCRIPTION OF A PREFERRED EMBODIMENT

With reference now to the drawing and particularly FIG. 1, the apparatus of this invention is shown generally as at 10, and is seen to include a housing 11 having a relatively flat bottom wall 12 on which the housing can be rested, a pair of upstanding side walls 13 and 14 and a top wall 15, the latter including a portion 16 elevated angularly from the remainder of the top wall, such that when the housing is resting on a horizontal surface, the portion 16 is generally upright and readily available to the view of the user.

A set of cards 17 is mounted within an opening 18 in the top wall upright portion 16 in a way that will be more particularly described. On the generally horizontal surface of the top wall there is provided a set of pushbuttons 19 for controlling a digital electronic calculator 20 located within the housing 11. The calculator is positioned against the under surface of the generally horizontal portion of the housing top wall by guide projections 21 and 22 to extend the pushbuttons through the top wall.

Immediately adjacent the pushbuttons 19 there is mounted on the same generally horizontal housing top wall a timing and calculator control panel 23 including a plurality of control switches thereon. A first or mode switch 24 is adjustable either to energize the calculator 20 or a digital timing apparatus 20' mounted adjacent the calculator. Also, a start-stop switch 25 and alarm switch 26 are located on the same panel. According to the setting of the mode switch, the digital display 27 mounted on the slant surface 16 just above the opening 18 will show either a time indication or calculated data, as the case may be. Cabling 28 and 29 provides the necessary interconnection between the calculator, control switches and display. An audible warning means 30 is conveniently located in the front wall 31 of the housing for providing an indication when a predetermined time interval has elapsed.

The housing opening 18 is generally rectangular with approximately one-half of it being in the upright angularly disposed surface 16 and the remainder in the horizontal top wall 15. The cards 17 are so dimensioned as to be received readily within the opening 18 and are removably mounted on a rotor 32, the latter being secured onto an axle 33 and the ends of which axle extend through the side walls 13 and 14 as best seen in FIG. 3. Finger actuated knobs 34 are secured onto each end of the shaft 33, via which the rotor and cards carried thereby can be adjustably located for selective review.

Although a large variety of information can be provided on the cards 16, for purposes of this invention, it is contemplated that these cards will include listings of foodstuffs with their caloric content, mineral content and the like made available. It would also be desirable to include such other things as typical daily nutritional needs, health tips and perhaps an exercise program. As but one example and as is shown in FIG. 4, one card is depicted as including the information that a cup of turnips weighing 155 grams has the mineral, water, fat and carbohydrate content shown, a total food energy of 35 calories. In addition, cards can be included with recipes for various meals such that the user of the device can decide on a particular meal and then revert back to those cards showing the content of the individual foods to be used in the meal and from which the mineral, caloric content or other substance found therein can be determined.

As the substantive content of the different foods comprising a meal are determined from the card, they are immediately read into the calculator by appropriate manipulation of the pushbuttons 19 from which the total amount of the monitored food constituent is substantially instantly displayed at 27.

Still further, when during the cooking operation it is desired to time some part thereof, this can readily be accomplished by manipulative adjustment of the switches on the control panel 23. At the conclusion of the prescribed set time, the alarm 30 can be made to inform the user of the equipment, if so desired, by adjustment of switch 26 in conjunction with mode switch 24.

There is provided in the practice of this invention a device providing ready access to a set of cards bearing information on the content of different substances in foods, as well as recipes and meal instructions, among other things. Mounted on the same common support are a digital calculator and time control means with a display which is selectively interconnected with either. The device is portable for use other than at a preferred location such as a kitchen, for example. The power supply for the calculator and timing apparatus can be optionally conventional batteries, rechargeable batteries or by direct connection with the household mains. The device thus in one compact unit provides a means for an individual to monitor his nutrition quickly and easily, thereby promoting good eating habits (whether for weight, health, or both) and good health. It is also clear that the timing apparatus can be used for exercising purposes, such as to measure elapsed time for one or more exercise maneuvers.

I claim:

1. A device comprising:

a hollow housing having a top wall, side walls and a bottom wall, the top wall having a first substantially horizontal portion and a second portion integral with the first portion which extends angularly upwardly therefrom;

said housing top wall including walls defining an opening which is in both said first and second portions;

an axle having its ends rotatably mounted in the housing side walls;

a plurality of information bearing elements carried by said axle and so arranged as to extend within the housing opening and adapted for viewing from the housing exterior;

a pushbutton digital calculator having the pushbuttons mounted on the housing top wall portion; and a display means for the digital calculator mounted on the housing top wall second portion above the opening therein.

2. A device as in claim 1, in which the outer ends of the axle are provided with knobs affixed thereon.

3. A device as in claim 1, in which there is further provided a digital timing means mounted on the housing top wall first portion and interconnected with said display means.

4. A device as in claim 2, in which there is provided switching means for selectively interconnecting the calculator and timing means with the display means, and when the timing means is so interconnected, said timing means actuates means for giving an audible signal at the conclusion of a predetermined time period.

* * * * *